US011160256B2

(12) United States Patent
Connolly et al.

(10) Patent No.: US 11,160,256 B2
(45) Date of Patent: Nov. 2, 2021

(54) ANIMAL RESTRAINT SYSTEMS WITH CINCHING MECHANISMS AND ASSOCIATED DEVICES AND METHODS

(71) Applicant: RC Products Ltd., Vancouver (CA)

(72) Inventors: Jillian Connolly, Delta (CA); Kasumi Forth, Vancouver (CA); Marilia Valencio Alves, Vancouver (CA)

(73) Assignee: RC Products Ltd., Vancouver (CA)

( * ) Notice: Subject to any disclaimer, the term of this patent is extended or adjusted under 35 U.S.C. 154(b) by 188 days.

(21) Appl. No.: 16/430,221

(22) Filed: Jun. 3, 2019

(65) Prior Publication Data

US 2020/0375151 A1    Dec. 3, 2020

(51) Int. Cl.
*A01K 27/00* (2006.01)

(52) U.S. Cl.
CPC .......... *A01K 27/002* (2013.01); *A01K 27/005* (2013.01)

(58) Field of Classification Search
CPC ............................. A01K 27/002; A01K 27/005
See application file for complete search history.

(56) References Cited

U.S. PATENT DOCUMENTS

| | | | |
|---|---|---|---|
| 7,243,615 B1 | 7/2007 | Hendrie | |
| 7,891,322 B2* | 2/2011 | Bennett | A01K 27/002 119/856 |
| 8,051,808 B2* | 11/2011 | Mugford | A01K 27/002 119/792 |
| 2006/0096552 A1 | 5/2006 | Tsai | |
| 2006/0102102 A1* | 5/2006 | Bennett | A01K 27/005 119/792 |
| 2007/0266960 A1* | 11/2007 | Mugford | A01K 27/002 119/792 |
| 2015/0007778 A1 | 1/2015 | Yamin | |
| 2017/0196200 A1* | 7/2017 | Wilson | A01K 15/02 |
| 2017/0280685 A1* | 10/2017 | McCain | A01K 27/002 |

FOREIGN PATENT DOCUMENTS

| | | |
|---|---|---|
| CN | 202565953 U | 12/2012 |
| WO | 2015171170 A1 | 11/2015 |

OTHER PUBLICATIONS

Canada International Search Authority, International Search Report and Written Opinion dated Oct. 5, 2020 for PCT/IB2020/000457 filed Jun. 2, 2020, 8 pages.

* cited by examiner

*Primary Examiner* — Kristen C Hayes
(74) *Attorney, Agent, or Firm* — Perkins Coie LLP

(57) ABSTRACT

The present technology generally relates to animal restraint systems with cinching mechanisms and associated devices and methods. A restraint system, such as a harness for a dog, in accordance with the present technology can include a back strap, a sternum strap, a chest strap assembly, and a cinching mechanism coupled to the chest strap assembly. When an animal or person pulls on a free-end portion of a cinching strap, the cinching mechanism draws opposing sides of the chest strap assembly closer together and, thereby, tightens the harness across the chest of the animal. Cinching mechanisms in accordance with the present technology avoid substantial shifting or rotation of the harness on the neck or torso of the animal in response to a lunging, pulling, tugging, or other force.

20 Claims, 4 Drawing Sheets

ANIMAL RESTRAINT SYSTEMS WITH CINCHING MECHANISMS AND ASSOCIATED DEVICES AND METHODS

TECHNICAL FIELD

The present technology generally relates to animal restraint systems, and in particular, to harnesses and collars with cinching mechanisms that provide increased control over a quadrupedal animal.

BACKGROUND

Animal restraint systems are used to restrain and control the movement of quadrupedal animals, such as dogs. Harnesses typically have multiple straps that loop around the sternum of an animal, with one strap extending across the sternum in front of the forelimbs and one strap extending around the animal's body behind the forelimbs. Collars typically have one strap that extends around an animal's neck. These harnesses and collars often include a ring or other structure that enables a leash to be releasably secured to the harness or collar. A pet owner or sitter can then use the leash in conjunction with the harness or collar to control the movement of the animal.

DETAILED DESCRIPTION

The present technology is directed to animal restraint systems, such as collars and harnesses, with cinching mechanisms and associated systems and methods. In particular, the present technology includes a limited-slip cinching mechanism that allows greater control of a quadrupedal animal. For example, in some embodiments, the limited-slip cinching mechanism avoids the cinching mechanism on a collar or harness—and the leash attachment member attached thereto—from substantially shifting or rotating across on the body of the quadrupedal animal in response to a lunging, pulling, tugging, or other force applied by the animal or the controller (e.g., pet owner) on the harness. By substantially maintaining the centered position of the cinching mechanism, the restraint system can allow the user (e.g., a pet owner) to provide more refined control over animal, translate more force to the harness, and/or avoid discomfort for the animal caused by straps shifting or rotating across the animal.

Specific details of several embodiments of the present technology are described herein with reference to FIGS. 1-4C. Although many of the embodiments are described with respect to harnesses with front-positioned lead attachments for dogs, other applications and other embodiments in addition to those described herein are within the scope of the present technology. For example, at least some embodiments of the present technology include a collar having the limited slip cinching mechanism, a harness with a limited slip cinching mechanism positioned at the animal's back, and/or a harness or collar suitable for other quadrupedal animals. It should be noted that other embodiments in addition to those disclosed herein are within the scope of the present technology. Moreover, a person of ordinary skill in the art will understand that embodiments of the present technology can have configurations, components, and/or procedures in addition to those shown or described herein and that these and other embodiments can be without several of the configurations, components, and/or procedures shown or described herein without deviating from the present technology.

Figure 1:
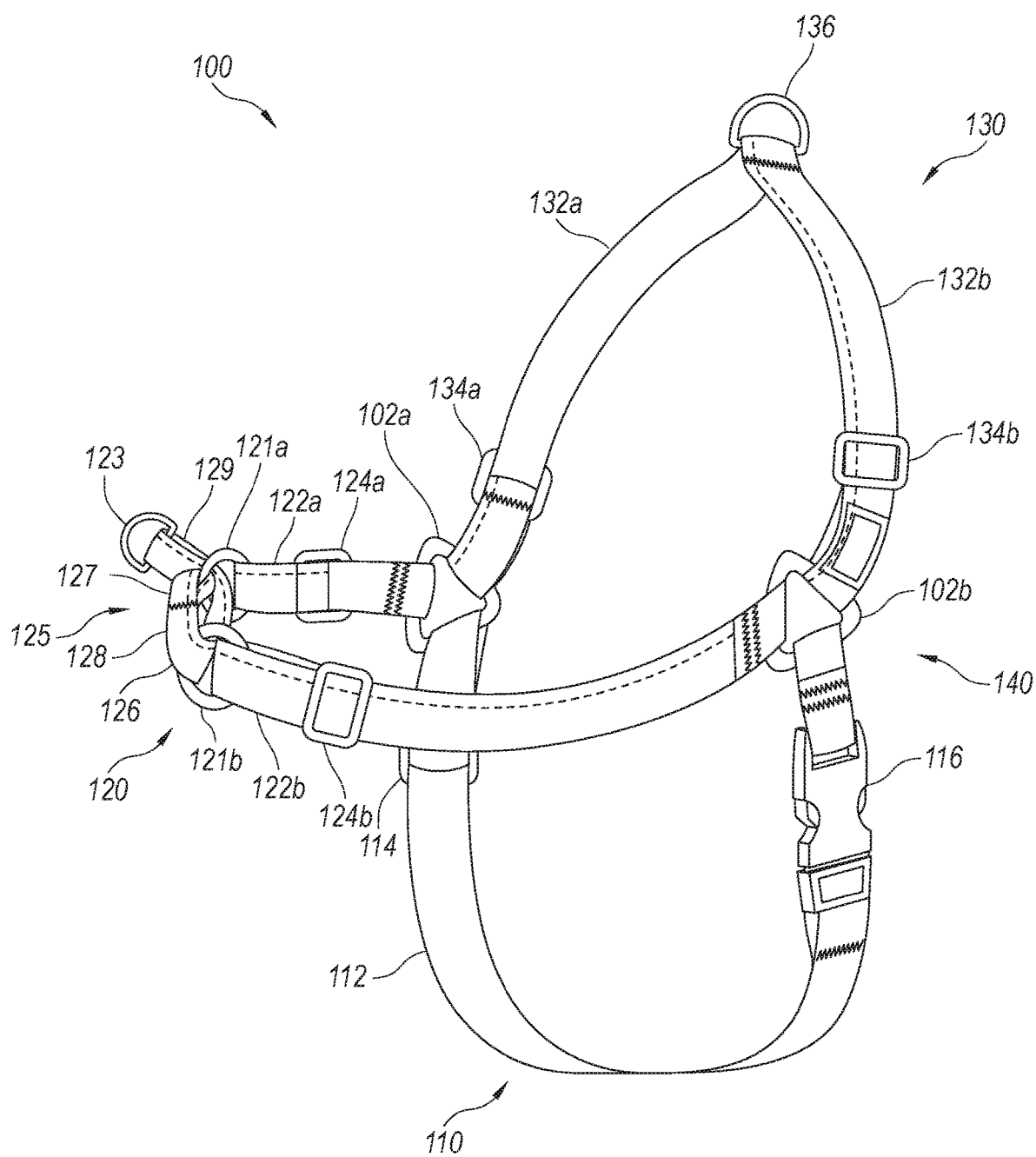
FIG. 1 is an isometric view of an animal harness configured in accordance with embodiments of the present technology.

FIG. 1 is an isometric view of a restraint system 100 (also referred to as a "harness 100") for a quadrupedal animal configured in accordance with embodiments of the present technology. The harness 100 includes a plurality of straps (also referred to as webbing or webs that extend around various portions of the animal's body. For example, the harness 100 can include sternum strap assembly 110, a chest strap assembly 120, a back strap assembly 130, and a cinching mechanism 125. The sternum strap assembly 110 is positionable under the sternum of a quadrupedal animal, such as a dog, the back strap assembly 130 is positionable over the back of the quadrupedal animal, and the chest strap assembly 120 is positionable across the chest of the quadrupedal animal. The sternum strap assembly 110, the chest strap assembly 120, and the back strap assembly 130 may be coupled together at a first junction 102a and a second junction 102b (collectively referred to as the "junctions 102"). For example, the sternum strap assembly 110 may be coupled to the back strap assembly 130 at the first junction 102a and the second junction 102b. Together, the sternum strap assembly 110 and the back strap assembly 130 can define a torso strap assembly 140 that forms a loop positionable around the torso of the quadrupedal animal, such that the first junction 102a and the second junction 102b are positioned at opposite sides of the quadrupedal animal. In some embodiments, the torso strap assembly 140 is a unitary structure, rather than separate webbing components designated for the back and torso of the animal. The cinching mechanism 125 can cause a portion of the harness 100 operably coupled thereto (e.g., the chest strap assembly 120) to tighten around the animal when a pulling force is applied to the cinching mechanism 125. As discussed below, the harness 100 provides this tightening while still substantially maintaining the same position of the cinching mechanism 125 and/or the harness 100 with respect to the animal as when the cinching mechanism 125 was in its un-tensioned state.

The chest strap assembly 120 may be coupled to the torso strap assembly 140 at the first junction 102a and the second junction 102b. The junctions 102 can comprise a connector suitable to couple the sternum strap assembly 110, the chest strap assembly 120, and the back strap assembly 130, and can be made of rigid or substantially rigid material, such as metal or plastic. For example, as illustrated in FIG. 1, the junctions 102 are triangular connectors. In some embodiments, the junctions 102 may comprise circular or ring-shaped connectors, D-ring connectors, rectangular connectors, or any other shape suitable for connecting the straps of the harness 100 together.

The sternum strap assembly 110 can include a sternum strap 112 extending between the first junction 102a and the second junction 102b. When worn by the quadrupedal animal, the sternum strap 112 can be positioned behind the front legs and underneath the sternum of the animal such that it rests against the lower ribcage and/or stomach of the quadrupedal animal. In some embodiments, the sternum strap assembly 110 can further include an adjustment mechanism 114 that can adjust a length of the sternum strap 112 and maintain the sternum strap assembly 110 at a selected length during use. As such, the adjustment mechanism 114 enables the sternum strap assembly to be adjusted to fit a particular animal.

The sternum strap assembly 110 can further include a fastener 116 transitionable between a fastened state and an unfastened state. In the unfastened state, the loop formed by the sternum strap assembly 110 and the back strap assembly 130 is incomplete, making it easier to put the harness 100 on the quadrupedal animal and/or to remove the harness 100 from the quadrupedal animal. When the fastener 116 is in the fastened state, a complete loop is formed between the sternum strap assembly 110 and the back strap assembly 130. Thus, the fastener 116 can releasably secure the harness on the quadrupedal animal in the fastened state.

Figure 3:
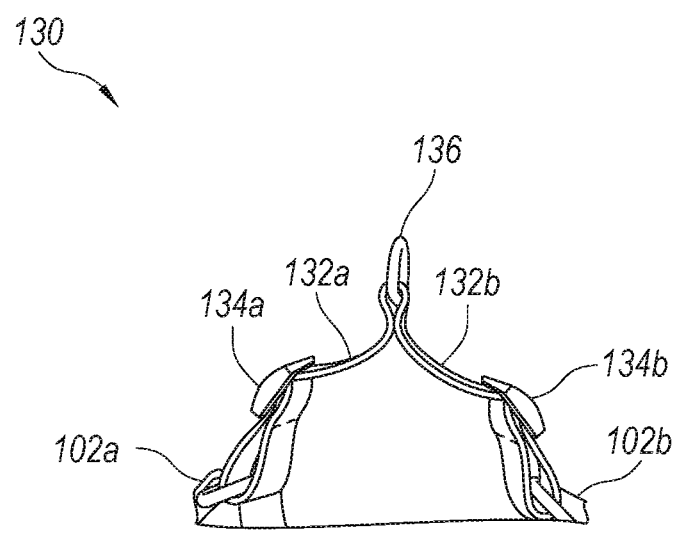
FIG. 3 is an enlarged isometric view of a back strap assembly of the harness depicted in FIG. 1.

The back strap assembly 130 can include a first back strap portion 132a, a second back strap portion 132b (collectively referred to as the "back strap 132"), and a leash or lead connector 136. FIG. 3 is an enlarged isometric view of a portion of the back strap assembly 130 of FIG. 1. Referring to FIGS. 1 and 3 together, the first back strap portion 132a may have a first end region coupled to the first junction 102a and a second end region coupled to the leash connector 136. The second back strap portion 132b may have a first end region coupled to the second junction 102b and a second end region coupled to the leash connector 136. Thus, the first back strap portion 132a and the second back strap portion 132b may be connected at the leash connector 136. The leash connector 136 can be any shape suitable for securing a leash to. For example, the leash connector may be a D-ring, in which the straight side of the D-ring connector is fixedly secured to at least one of the back strap portions 132. The leash can be connected to the half-circle portion of the D-ring. In these and other embodiments, the leash connector may be ring shaped, triangular, rectangular, or any other suitable shape.

The first back strap portion 132a may also include a first adjustment mechanism 134a, and the second back strap portion 132b may also include a second adjust mechanism 134b. The first and second adjustment mechanisms 134a, 134b (collectively referred to as the "adjustment mechanisms 134") can adjust a length of the first back strap portion 132a and the second back strap portion 132b, respectively. The adjustment mechanisms 134 can also have a tension that maintains the length of the back strap portions 132 when the harness is worn by the quadrupedal animal. Thus, adjustment mechanisms 134 enable the back strap assembly 130 to be adjusted to fit a particular animal. While the back strap assembly 130 illustrated in FIG. 1 includes a single back strap that has first and second back strap portions 132a, 132b extending across the animal's back, the back strap assembly 130 can instead comprise two or more back straps extending between the first junction 102a and the second junction 102b. In some embodiments, the back strap assembly 130 can include a single adjustment mechanism for adjusting a length of the back strap 132 or more than two adjustment mechanisms.

The chest strap assembly 120 can include a first chest strap 122a, a second chest strap 122b (collectively referred to as the "chest straps 122"), a first connector 121a, and a second connector 121b (collectively referred to as the "connectors 121"). The first chest strap 122a can have a first end portion coupled to the first junction 102a and a second end portion coupled to the first connector 121a such that the first chest strap 122a extends between the first junction 102a and the first connector 121a. Likewise, the second chest strap 122b can have a first end portion coupled to the second junction 102b and a second end portion coupled to the second connector 121b such that the second chest strap 122b extends between the second junction 102b and the second connector 121b.

As Illustrated, the first connector 121a and the second connector 121b are not directly coupled together (e.g., they can be spaced apart from each other by a distance). Therefore, unlike traditional harnesses, the chest strap assembly 120 does not form a complete loop by itself (e.g., the chest strap assembly 120 does not directly connect the first junction 102a and the second junction 102b). Rather, as will be described in more detail below, the cinching mechanism 125 interacts with the connectors 121 to complete the chest strap assembly's loop between the first junction 102a and the second junction 102b.

The first connector 121a can have a first aperture extending therethrough, and the second connector 121b can have a second aperture extending therethrough. As such, the connectors 121 can be substantially ring-shaped (e.g., forming a circle or oval). In some embodiments, however, the connectors 121 can take other shapes, such as D-ring, rectangular, pentagonal, hexagonal, or any other shape suitable for use with the chest strap assembly 120 and the cinching mechanism 125 described herein.

The chest strap assembly may further include a first adjustment mechanism 124a and a second adjustment mechanism 124b (collectively referred to as the "adjustment mechanisms 124"). The first adjustment mechanism 124a can adjust a length of the first chest strap 122a, and the second adjustment mechanism 124b can adjust a length of the second chest strap 122b. The adjustment mechanisms 124 can also have a tension that maintains the length of the chest straps 122. Therefore, the adjustment mechanisms 124 enable the chest strap assembly 120 to be adjusted to fit a particular animal.

The cinching mechanism 125 has a cinching strap 126, which includes a first end portion 127, a second end portion 129 (also referred to as a "free-end portion 129"), and a medial portion 128 extending between the first end portion 127 and the second end portion 129. The first end portion 127 can be fixedly attached to the first connector 121a of the chest strap assembly 120. The medial portion 128 can extend from the first end portion 127, through the second aperture of the second connector 121b, and through the first aperture of the first connector 121a. The medial portion 128 can be slidable with respect to the connectors 121. Thus, as will be described in greater detail with respect to FIGS. 4A-4C, when tension is applied to the second end portion 129 of the cinching strap 126, the cinching strap 126 can slide through the first and second apertures and extend a distance between the second end portion 129 and the first connector 121a. At least partially because the first end portion 127 is fixedly attached to the first connector 121a and extends through both connectors 121, tension applied to the second end portion 129 can also draw the connectors 121 towards each other. Although shown as a single strap 126, in some embodiments, the cinching mechanism 125 can include two or more pieces of webbing or straps coupled together to provide the described cinching features. In some embodiments, the cinching mechanism 125 can be oriented in the opposite direction shown in the drawings such that the first end portion 127 is fixedly attached to the second connector 121b and loops through the first aperture of the first connector 121a.

The cinching mechanism 125 can also include a leash or lead connector 123. For example, the leash connector 123 can be fixedly attached to the second end portion 129 of the cinching strap 126. Like with the leash connector 136 of the back strap assembly 130, the leash connector 123 can be any shape suitable for releasably securing a leash to. For example, the leash connector may be a D-ring, in which the straight side of the D-ring connector is fixedly secured to the second end portion 129 of the cinching strap 126. The leash can be connected to the half-circle portion of the D-ring. In various embodiments, the leash connector 123 may be ring shaped, triangular, rectangular, or any other suitable shape.

Figure 2:
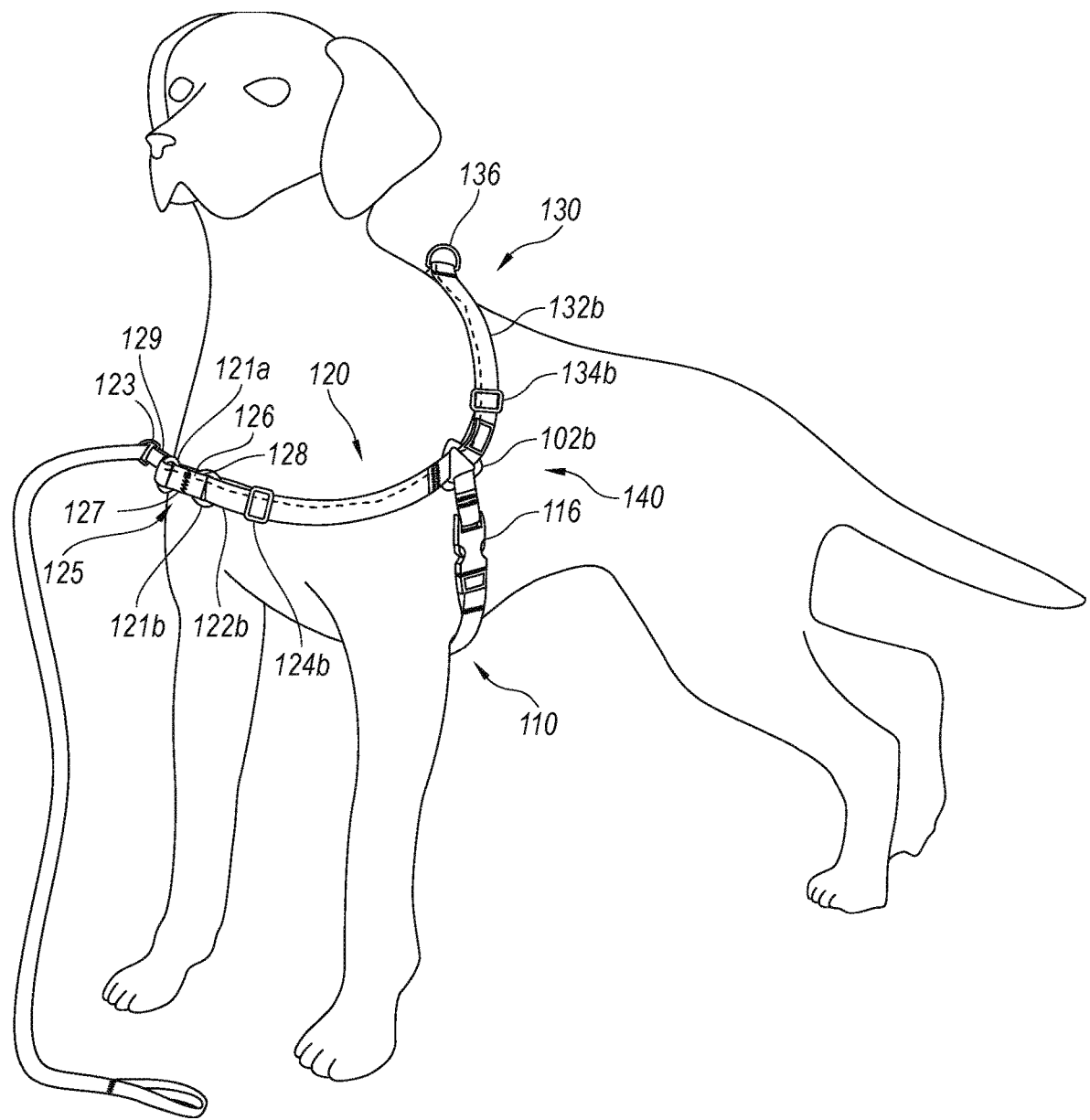
FIG. 2 is an isometric view of a dog wearing the harness depicted in FIG. 1.

FIG. 2 is an isometric view of a dog wearing the harness 100 of FIG. 1. As illustrated, the sternum strap assembly 110 is positionable behind the dog's front legs and under the dog's sternum such that it rests against the dog's lower ribcage and/or stomach. The back strap assembly 130 is positionable over the back of the dog. The chest strap assembly 120 is positionable across the chest of the dog. The junctions 102 are positionable on opposing sides of the dog, and the cinching mechanism 125 is positionable in a generally centered position across the dog's chest. As shown in FIG. 2, the leash connector 123 can be coupled to a lead or leash 101 that can be secured by a person or other operator (e.g., a robotic structure, a stationary structure) to restrain or otherwise control movement of the animal The adjustment mechanisms described above may be used to adjust the lengths of various straps to select the appropriate fit of the harness 100 on the animal. While FIG. 2 illustrates a dog, one skilled in the art will appreciate that the technology applied herein may be equally applicable to various other animals.

Figure 4A:
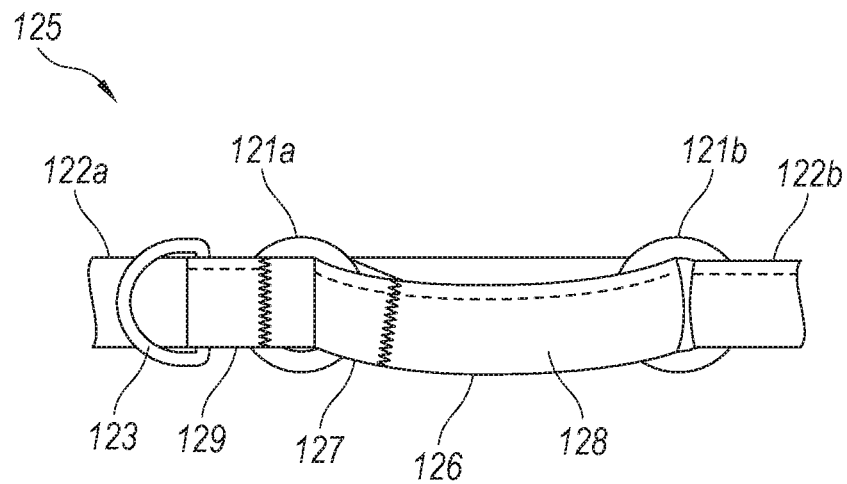
FIG. 4A is an enlarged front view of a cinching mechanism of the harness depicted in FIG. 1.
Figure 4B:
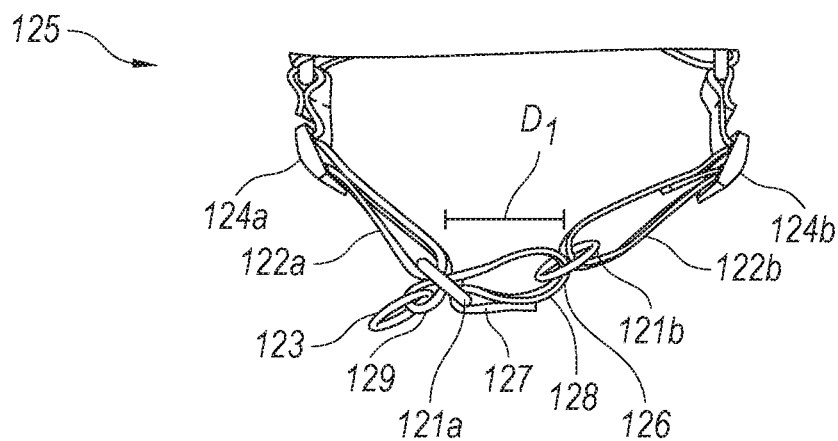
FIGS. 4B and 4C are top views of the cinching mechanism of FIG. 4A in a first state and a second state, respectively, in accordance with embodiments of the present technology.
Figure 4C:
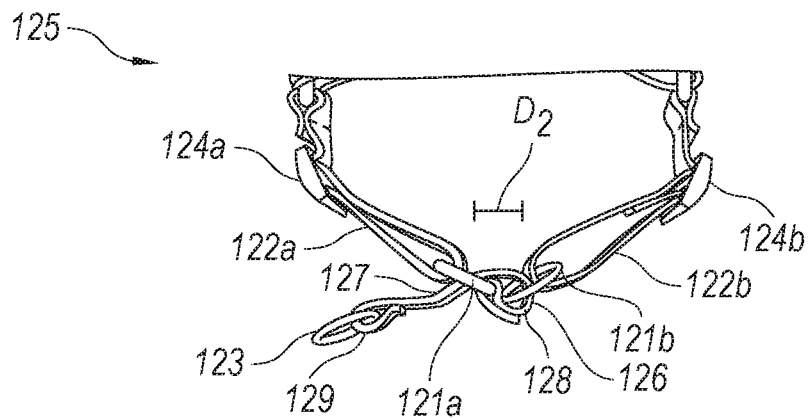

FIGS. 4A-4C are enlarged views of the cinching mechanism 125 of the harness 100 of FIG. 1. More specifically, FIG. 4A is an enlarged front view of the cinching mechanism 125 and depicts the cinching strap 126 interacting with the connectors 121 of the chest strap assembly 120, and FIGS. 4B and 4C are enlarged top views of the cinching mechanism 125 in different operating states—an un-cinched or relaxed state shown in FIG. 4B and a cinched state shown in FIG. 4C.

Referring to FIG. 4B, the cinching mechanism 125 is in the un-cinched or first state in which little to no tension is applied to the second end portion 129 of the cinching strap 126. For example, the cinching mechanism 125 may be in the first state if no leash is connected to the leash connector 123 and/or when the leash is slack, if the quadrupedal animal is not pulling or otherwise creating tension at leash connector 123, and/or if a person controlling the leash is not pulling or otherwise creating tension at the leash connector 123. In some embodiments, the cinching mechanism 125 may be biased towards the first state until a tension is applied at the second end portion 129 of the cinching strap 126. The harness 100 may be configured such that the cinching mechanism 125 is generally centered on the chest of the quadrupedal animal when in the first state, although the chest strap assembly 120 may not be tight around the animal's chest in the first state due to the lack of tension at the second end portion 129. In some embodiments, the harness 100 may be configured such that the cinching mechanism 125 is located in a specific position offset from center when the cinching mechanism is in the first state.

As further shown in FIG. 4B, when the cinching mechanism is in the first state, the first connector 121a and the second connector 121b are spaced apart by a first distance $D_1$. As one skilled in the art will appreciate from the disclosure herein, the first distance $D_1$ can vary based on the size of the quadrupedal animal, the length of the chest strap assembly 120, the length of the cinching strap 126, the overall tightness of the harness 100, and/or the amount of tension at the second end portion 129. As will be discussed with respect to FIG. 4C, when a tension is applied at the second end portion 129 of the cinching strap 126, the distance between the first connector 121a and the second connector 121b is reduced.

FIG. 4C illustrates the cinching mechanism 125 in the cinched, second state in which tension is applied to the second end portion 129 of the cinching strap 126 (e.g., a tensioned state created by a pulling or other force at leash connector 123). The tension causes the cinching strap 126 to transition from the first state to the second state. For example, the tension can cause the medial portion 128 of the cinching strap 126 to slide through the first and second apertures of the first and second connectors 121a, 121b and can draw the first and second connectors 121a, 121b towards each other, thereby reducing a distance between the connectors 121 from the first distance $D_1$ to a second distance $D_2$. Because the cinching strap 126 is fixedly attached to the first connector 121a, passes through the second aperture of the second connector 121b, and passes through the first aperture of the first connector 121a, both the first and second connectors 121a-b are drawn together with substantially equal forces. As the distance between the connectors 121a-b decreases, the overall length of the chest strap assembly 120 to decrease, thus causing the chest strap assembly 120 and/or the harness 100 to tighten around the animal. This tightening enhances the control the person or device has over the animal's movement via the leash or other element connected to the leash connector 123.

As one skilled in the art will appreciate, the difference between the first distance $D_1$ and the second distance $D_2$ in the first and second states will depend on a number of factors, including, for example, the magnitude of the tension applied at the second end portion 129. Generally, when the harness is not worn by an animal, a tension applied to the second end portion 129 will draw the connectors 121 towards each other until the second distance $D_2$ is substantially zero. However, when the harness is worn by an animal, a tension applied to the second end portion 129 will draw the connectors 121 towards each other until the harness is substantially tight around the animal. Thus, when the harness is worn by an animal, the second distance $D_2$ may not be substantially zero, but rather can be based at least in part on the size of the animal and the magnitude of the tension at the second end portion 129.

Because the cinching mechanism 125 draws the connectors 121 towards each other with substantially equal force, the cinching mechanism 125 can remain in generally the same position (e.g., a centered position) with respect to the animal's body when transitioning from the first state to the second state. Whereas other harnesses or collars with cinching control mechanisms, such as slip leads tend to shift off center, rotate, and/or twist across the chest, neck, or back of the pet when they are tightened around the animal, the present harness 100 allows the cinching mechanism 125 and the chest strap assembly 120 to remain in generally the same relative position with respect to the animal body (e.g., centered across the animal's chest) without substantial shifting or rotation on the body of the animal. For example, when a leash is connected to the cinching mechanism 125 via the leash connector 123 and a tension is applied to the cinching mechanism 125 (e.g., by the animal or leash operator pulling on the leash), the cinching mechanism 125 causes the chest strap assembly 120 to tighten around the chest of the animal, but does not substantially shift the harness 100 or the chest strap assembly 120 in the direction of the tension, even if it is to the side rather than head on. The shifting of the position of the connection or control point (at the leash connector 123) experienced by other harnesses or collars could reduce the overall level of control over the movement of the animal because the control site is off-center with respect to the animal and/or the harness 100 first shifts or otherwise translates before imparting force on the animal. This shifting or rotation may also trigger a natural response by the animal to pull harder against the leash and/or chafe against the animal's body. Thus, the ability of the present harness 100 to maintain the leash connector 123 and underlying control site in substantially the same position, can increase the overall control over the animal's movements and can increase the comfort of the harness 100 for the animal.

While the cinching mechanism 125 is described above with respect to a first state and a second state, one skilled in the art will appreciate that the cinching mechanism can occupy any number of positions between a relaxed state with little to no tension at the leash connector 123 and a tensioned state with substantial tension at the leash connector 123. Thus, the first and second states are discussed herein do not limit the present disclosure to transitioning between only two different positions. Moreover, as one skilled in the art will appreciate, the cinching mechanism 125 may take other configurations while remaining within the scope of the present technology. For example, the first end portion 127 of the cinching strap 126 can be connected to the second connector 121b instead of the first connector 121a. As another example, the fastener 116 can be positioned at different locations along the harness 100 and/or more than one fastener 116 can be included. As yet another example, the harness 100 can include a variable number of adjustment mechanisms in addition to or in lieu of those described above with respect to FIG. 1.

The cinching mechanisms described herein can also be used with other types of harnesses and animal restraint systems. For example, in some embodiments, a back strap assembly can include features substantially similar to the features of the chest strap assembly 120 described with respect to FIGS. 1-4A such that the cinching mechanism 125 described herein can be positioned on the back strap assembly 130. In such embodiments, the cinching mechanism 125 and the leash connector 123 are positionable across the back of the quadrupedal animal, rather than across the animal's chest. Other embodiments may include multiple cinching mechanisms, with a first cinching mechanism for use with the chest strap assembly and a second cinching mechanism for use with the back strap assembly. Additionally, while the above-embodiments describe the cinching mechanism 125 for use with the harness 100, the cinching mechanism 125 can also be used with a collar positionable around an animal's neck.

Any components of the harnesses or collars described herein, including the cinching mechanism 125, can comprise material(s) suitable for use with animal restraint systems. For example, the straps (e.g., the sternum strap 112, the chest straps 122, the cinching strap 126, and the back strap portions 132) can comprise nylon webbing, leather, polyester, and/or other materials suitable for use. The various connectors (e.g., the junctions 102, the connectors 121, and the leash connectors 123, 136) can comprise plastics, metals, and/or other rigid, substantially rigid, or pliable materials suitable for use.

The present technology also provides methods of controlling the movement of a quadrupedal animal. For example, the method can include providing a harness or collar including a cinching mechanism as described herein (e.g., cinching mechanism 125). Before use, the harness or collar can be adjusted to comfortably fit the dog by using one or more of the adjustment mechanisms. A comfortable fit may include a generally snug fit such that the harness or collar remains in the same general position on the animal. However, the fit should not be overly tight across the chest so that the cinching mechanism can operate as described above with respect to FIGS. 4A-4C. The method can further include securing the harness or collar to the quadrupedal animal via a fastener (e.g., fastener 116) and attaching a leash to a leash connector connected to the cinching mechanism (e.g., leash connector 123). Once the leash is attached to the cinching strap mechanism, greater control can be exerted over the movement of the quadrupedal animal.

EXAMPLES

1. A restraint system, such as a harness, for a quadrupedal animal, the harness comprising:
   a torso strap assembly defining a loop configured to extend around a torso of the quadrupedal animal, the torso strap assembly having a first junction and a second junction spaced apart from the first junction along the loop such that the first junction and the second junction are configured to be positioned at opposite sides of the quadrupedal animal;
   a chest strap assembly coupled to the torso strap assembly at the first and second junctions, the chest strap assembly comprising—
      a first connector having a first aperture extending therethrough,
      a second connector having a second aperture extending therethrough,
      a first chest strap extending between the first junction and the first connector, and
      a second chest strap extending between the second junction and the second connector, and
   a cinching mechanism comprising a cinching strap having a first end portion, a second end portion, and a medial portion extending between the first end portion and the second end portion, wherein—
      the first end portion is fixedly attached to the first connector,
      the medial portion extends from the first end portion, through the second aperture of the second connector, and through the first aperture of the first connector,
      the medial portion is slidable with respect to the first connector and the second connector such that, when the second end portion of the cinching strap is pulled, the cinching mechanism draws the first and second connectors toward each other to decrease an overall length of the chest strap assembly and tighten the harness around a chest of the quadrupedal animal.

2. The restraint system of example 1, further comprising a leash connector at the second end portion of the cinching strap.

3. The restraint system of example 2 wherein the leash connector is a D-ring.

4. The restraint system of any one of examples 1-3 wherein the torso strap assembly comprises:
   a back strap assembly positionable across the back of the quadrupedal animal; and
   a sternum strap assembly positionable across the sternum of the quadrupedal animal and coupled to the back strap assembly at the first junction and the second junction.

5. The restraint system of example 4 wherein the back strap assembly comprises a leash connector.

6. The restraint system of example 4 wherein the back strap assembly comprises a first back strap portion, a second back strap portion, and a leash connector, and wherein the first back strap portion and second back strap portion are connected at the leash connector.

7. The restraint system of any one of examples 1-6, further comprising at least one adjustment mechanism coupled to the torso strap assembly, wherein the adjustment mechanism is configured to adjust a length of the torso strap assembly and maintain the torso strap assembly at a selected length during use.

8. The restraint system of any one of examples 1-7, further comprising an adjustment mechanism coupled to the first chest strap, wherein the adjustment mechanism is configured to adjust a length of the first chest strap and maintain the first chest strap at a selected length during use.

9. The restraint system of any one of examples 1-8, further comprising a fastener transitionable between a fastened state and an unfastened state, wherein the fastener is configured to secure the restraint system on the quadrupedal animal in the fastened state.

10. The restraint system of example 9 wherein the fastener is connected to the torso strap assembly.

11. The restraint system of any one of examples 1-10 wherein:
   the cinching mechanism has a first state in which there is little to no tension applied to the second end portion of the cinching strap and a second state in which tension is applied to the cinching strap to decrease the overall length of the chest strap assembly,
   the cinching mechanism is configured to be in a generally centered position on the chest of the quadrupedal animal when the cinching mechanism is the first state, and
   the cinching mechanism is configured to remain in the generally centered position when the cinching mechanism is in second state without substantial shifting.

12. The restraint system of any one of examples 1-11 wherein the first connector and the second connector are ring-shaped connectors.

13. A restraint system, such as a harness, for a quadrupedal animal, the restraint system comprising:
   a back strap positionable over a back of the animal;
   a sternum strap positionable behind front legs and under a sternum of the animal;
   a chest strap assembly positionable over a chest of the animal, the chest strap assembly comprising:
      a first chest strap having a first connector with a first aperture therethrough,
      a second chest strap having a second connector with a second aperture therethrough; and
   a cinching mechanism comprising a cinching strap having a first end portion fixedly attached to the first connector, a second end portion fixedly attached to a leash connection member, and a medial portion between the first end portion and the second end portion, the cinching mechanism configured such that a pulling force on the leash connection member causes the medial portion to slide through the first and second aperture, thereby tightening the chest strap across the chest of the animal.

14. The restraint system of example 13 wherein:
   the cinching mechanism has a first state in which there is little to no tension applied to the second end portion of the cinching strap and a second state in which tension is applied to the cinching strap to decrease an overall length of the chest strap assembly,
   the cinching mechanism is configured to be in a generally centered position on the chest of the quadrupedal animal when the cinching mechanism is the first state, and
   the cinching mechanism is configured to remain in the generally centered position when the cinching mechanism is in second state without substantial shifting.

15. The restraint system of example 13 or 14 wherein:
   the cinching mechanism has a first state in which there is little to no tension applied to the second end portion of the cinching strap and a second state in which tension is applied to the cinching strap, and
   the cinching mechanism has a distance between the second end portion and the first connector that increases when the cinching mechanism transitions from the first state to the second state.

16. The restraint system of any one of examples 13-15 wherein the sternum strap comprises a fastener transitionable between a fastened state and an unfastened state, and wherein the fastener is configured to secure the restraint system on the quadrupedal animal in the fastened state.

17. A cinching mechanism for use with a collar or harness, the cinching mechanism comprising:
   a first connector connectable to a first portion of a collar or harness, the first connector having a first aperture therethrough;
   a second connector connectable to a second portion of a collar or harness, the second connector having a second aperture therethrough; and
   a cinching strap having a first end portion, a second end portion, and a medial portion between the first end portion and the second end portion;
   wherein—
   the first end portion is fixedly attached to the first connector,
   the medial portion extends from the first end portion, through the second aperture of the second connector, and through the first aperture of the first connector,
   the second end portion is fixedly attached to a leash connector, and
   the medial portion is slidable with respect to the first connector and the second connector such that when the leash connector is pulled, the medial portion slides through the first and second apertures, thereby reducing a distance between the first connector and the second connector.

18. The cinching mechanism of example 17 wherein the cinching mechanism has a first state when there is little to no tension applied to the leash connector and a second state when tension is applied to the leash connector, and wherein the cinching mechanism tightens the collar or harness around the quadrupedal animal as it transitions from the first state to the second state.

19. The cinching mechanism of example 17 or 18 wherein the cinching mechanism has a first state when there is little to no tension applied to the leash connector and a second state when tension is applied to the leash connector, and wherein the cinching mechanism draws the first and second connectors toward each as it transitions from the first state to the second state.

20. A method of controlling the movement of a quadrupedal animal, the method comprising:
providing a restraint system, such as a harness or collar, including a cinching mechanism, the cinching mechanism comprising:
a first connector connectable to a first portion of the restraint system, the first connector having a first aperture therethrough;
a second connector connectable to a second portion of the restraint system, the second connector having a second aperture therethrough, and
a cinching strap having a first end portion, a second end portion, and a medial portion extending between the first end portion and the second end portion, wherein—
the first end portion is fixedly attached to the first connector,
the medial portion extends from the first end portion, through the second aperture of the second connector, and through the first aperture of the first connector, and
the medial portion is slidable with respect to the first connector and the second connector such that, when the second end portion of the cinching strap is pulled, the cinching mechanism draws the first and second connectors toward each other to tighten the restraint system around a portion of the quadrupedal animal.

CONCLUSION

The above detailed description of embodiments of the technology are not intended to be exhaustive or to limit the technology to the precise forms disclosed above. Although specific embodiments of, and examples for, the technology are described above for illustrative purposes, various equivalent modifications are possible within the scope of the technology as those skilled in the relevant art will recognize. For example, although steps are presented in a given order, additional embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A harness for a quadrupedal animal, the harness comprising:
a torso strap assembly defining a loop configured to extend around a torso of the quadrupedal animal, the torso strap assembly having a first junction and a second junction spaced apart from the first junction along the loop such that the first junction and the second junction are configured to be positioned at opposite sides of the quadrupedal animal;
a chest strap assembly coupled to the torso strap assembly at the first and second junctions, the chest strap assembly comprising—
a first connector having a first aperture extending therethrough,
a second connector having a second aperture extending therethrough,
a first chest strap extending between the first junction and the first connector, and
a second chest strap extending between the second junction and the second connector; and
a cinching mechanism comprising a cinching strap having a first end portion, a second end portion, and a medial portion extending between the first end portion and the second end portion, wherein—
the first end portion is fixedly attached to the first connector,
the medial portion extends from the first end portion, through the second aperture of the second connector, and through the first aperture of the first connector,
the medial portion is slidable with respect to the first connector and the second connector such that, when the second end portion of the cinching strap is pulled, the cinching mechanism draws the first and second connectors toward each other to decrease an overall length of the chest strap assembly and tighten the harness around a chest of the quadrupedal animal.

2. The harness of claim 1, further comprising a leash connector at the second end portion of the cinching strap.

3. The harness of claim 2 wherein the leash connector is a D-ring.

4. The harness of claim 1 wherein the torso strap assembly comprises:
a back strap assembly positionable across the back of the quadrupedal animal; and
a sternum strap assembly positionable across the sternum of the quadrupedal animal and coupled to the back strap assembly at the first junction and the second junction.

5. The harness of claim 4 wherein the back strap assembly comprises a leash connector.

6. The harness of claim 4 wherein the back strap assembly comprises a first back strap portion, a second back strap portion, and a leash connector, and wherein the first back strap portion and second back strap portion are connected at the leash connector.

7. The harness of claim 1, further comprising at least one adjustment mechanism coupled to the torso strap assembly, wherein the adjustment mechanism is configured to adjust a length of the torso strap assembly and maintain the torso strap assembly at a selected length during use.

8. The harness of claim 1, further comprising an adjustment mechanism coupled to the first chest strap, wherein the adjustment mechanism is configured to adjust a length of the first chest strap and maintain the first chest strap at a selected length during use.

9. The harness of claim 1, further comprising a fastener transitionable between a fastened state and an unfastened state, wherein the fastener is configured to secure the harness on the quadrupedal animal in the fastened state.

10. The harness of claim 9 wherein the fastener is connected to the torso strap assembly.

11. The harness of claim 1 wherein:
the cinching mechanism has a first state in which there is little to no tension applied to the second end portion of the cinching strap and a second state in which tension is applied to the cinching strap to decrease the overall length of the chest strap assembly,
the cinching mechanism is configured to be in a generally centered position on the chest of the quadrupedal animal when the cinching mechanism is the first state, and
the cinching mechanism is configured to remain in the generally centered position when the cinching mechanism is in second state without substantial shifting.

12. The harness of claim 1 wherein the first connector and the second connector are ring-shaped connectors.

13. A harness for a quadrupedal animal, the harness comprising:
a back strap positionable over a back of the animal;
a sternum strap positionable behind front legs and under a sternum of the animal;
a chest strap assembly positionable over a chest of the animal, the chest strap assembly comprising:
a first chest strap having a first connector with a first aperture therethrough,
a second chest strap having a second connector with a second aperture therethrough; and
a cinching mechanism comprising a cinching strap having a first end portion fixedly attached to the first connector, a second end portion fixedly attached to a leash connection member, and a medial portion between the first end portion and the second end portion, the cinching mechanism configured such that a pulling force on the leash connection member causes the medial portion to slide through the first and second aperture, thereby tightening the chest strap across the chest of the animal.

14. The harness of claim 13 wherein:
the cinching mechanism has a first state in which there is little to no tension applied to the second end portion of the cinching strap and a second state in which tension is applied to the cinching strap to decrease an overall length of the chest strap assembly,
the cinching mechanism is configured to be in a generally centered position on the chest of the quadrupedal animal when the cinching mechanism is the first state, and
the cinching mechanism is configured to remain in the generally centered position when the cinching mechanism is in second state without substantial shifting.

15. The harness of claim 13 wherein:
the cinching mechanism has a first state in which there is little to no tension applied to the second end portion of the cinching strap and a second state in which tension is applied to the cinching strap, and the cinching mechanism has a distance between the second end portion and the first connector that increases when the cinching mechanism transitions from the first state to the second state.

16. The harness of claim 13 wherein the sternum strap comprises a fastener transitionable between a fastened state and an unfastened state, and wherein the fastener is configured to secure the harness on the quadrupedal animal in the fastened state.

17. A cinching mechanism for use with a restraint system, the cinching mechanism comprising:
a first connector connectable to a first portion of the restraint system, the first connector having a first aperture therethrough;
a second connector connectable to a second portion of the restraint system, the second connector having a second aperture therethrough; and
a cinching strap having a first end portion, a second end portion, and a medial portion between the first end portion and the second end portion;
wherein—
the first end portion is fixedly attached to the first connector,
the medial portion extends from the first end portion, through the second aperture of the second connector, and through the first aperture of the first connector,
the second end portion is fixedly attached to a leash connector, and
the medial portion is slidable with respect to the first connector and the second connector such that when the leash connector is pulled, the medial portion slides through the first and second apertures, thereby reducing a distance between the first connector and the second connector.

18. The cinching mechanism of claim 17 wherein the cinching mechanism has a first state when there is little to no tension applied to the leash connector and a second state when tension is applied to the leash connector, and wherein the cinching mechanism tightens the restraint system around the quadrupedal animal as it transitions from the first state to the second state.

19. The cinching mechanism of claim 17 wherein the cinching mechanism has a first state when there is little to no tension applied to the leash connector and a second state when tension is applied to the leash connector, and wherein the cinching mechanism draws the first and second connectors toward each as it transitions from the first state to the second state.

20. A method of controlling the movement of a quadrupedal animal, the method comprising:
providing a restraint system including a cinching mechanism, the cinching mechanism comprising:
a first connector connectable to a first portion of the restraint system, the first connector having a first aperture therethrough;
a second connector connectable to a second portion of the restraint system, the second connector having a second aperture therethrough, and
a cinching strap having a first end portion, a second end portion, and a medial portion extending between the first end portion and the second end portion,
wherein—
the first end portion is fixedly attached to the first connector, the medial portion extends from the first end portion, through the second aperture of the second connector, and through the first aperture of the first connector, and the medial portion is slidable with respect to the first connector and the second connector such that, when the second end portion of the cinching strap is pulled, the cinching mechanism draws the first and second connectors toward each other to tighten the harness or collar around a portion of the quadrupedal animal.

\* \* \* \* \*